United States Patent
Mepschen

(10) Patent No.: US 9,504,964 B2
(45) Date of Patent: Nov. 29, 2016

(54) FILTRATION METHOD FOR OPERATING A FILTRATION MODULE WITH GAS FEED AT ITS PERMEATE SIDE TO PREVENT BACKFLOW OF PERMEATE

(75) Inventor: André Mepschen, Oosterhesselen (NL)

(73) Assignee: X-FLOW B.V., Enschede (NL)

(*) Notice: Subject to any disclaimer, the term of this patent is extended or adjusted under 35 U.S.C. 154(b) by 595 days.

(21) Appl. No.: 13/812,554

(22) PCT Filed: Jul. 14, 2011

(86) PCT No.: PCT/NL2011/050511
§ 371 (c)(1),
(2), (4) Date: Feb. 28, 2013

(87) PCT Pub. No.: WO2012/015298
PCT Pub. Date: Feb. 2, 2012

(65) Prior Publication Data
US 2013/0228514 A1   Sep. 5, 2013

(30) Foreign Application Priority Data
Jul. 30, 2010   (NL) ...................................... 2005177

(51) Int. Cl.
| B01D 65/02 | (2006.01) |
| B01D 61/10 | (2006.01) |
| B01D 61/20 | (2006.01) |
| B01D 65/00 | (2006.01) |

(52) U.S. Cl.
CPC ............ B01D 65/02 (2013.01); B01D 61/10 (2013.01); B01D 61/20 (2013.01); B01D 65/00 (2013.01); B01D 2311/06 (2013.01); B01D 2311/13 (2013.01); B01D 2313/26 (2013.01); B01D2315/10 (2013.01); B01D 2321/04 (2013.01); B01D 2321/2033 (2013.01)

(58) Field of Classification Search
CPC ................. B01D 2311/06; B01D 2311/2661; B01D 2311/13; B01D 2313/26; B01D 2315/10; B01D 2321/04; B01D 2321/2033; B01D 61/10; B01D 61/20; B01D 65/00; B01D 65/02
USPC ......................................................... 210/636
See application file for complete search history.

(56) References Cited

U.S. PATENT DOCUMENTS

| 3,756,408 A | 9/1973 | Spatz et al. |
| 5,958,243 A | 9/1999 | Lawrence et al. |
| 2006/0090651 A1* | 5/2006 | Liu et al. ........................ 96/121 |

(Continued)

FOREIGN PATENT DOCUMENTS

| EP | 208450 A2 | 1/1987 |
| EP | 5956899 A1 | 5/1994 |

OTHER PUBLICATIONS

English Machine Translation of EP 0595689.

*Primary Examiner* — Dirk Bass
(74) *Attorney, Agent, or Firm* — Hoffmann & Baron, LLP

(57) ABSTRACT

A method for operation of a filtration module 4 including a housing 5 with at least one filter element 7 positioned therein, the filter element defining a first space 10 in the housing at a feeding side of its filtering surface and a second space 11 at an opposite permeate side thereof, a fluid feed 14 opening out in the first space at the feeding side of the filter element, and a permeate outlet 17 in flow communication with the second space at the permeate side of the filter element, in which the filter element is placed in an upright position. The permeate outlet is positioned at a lower end of the filter element, and a gas feed 18 is provided opening out in the second space at said permeate side of the filter element. During filtration, pressurized gas is fed into the second space.

10 Claims, 4 Drawing Sheets

(56) References Cited

U.S. PATENT DOCUMENTS

2007/0158256 A1 7/2007 Kromkamp et al.
2009/0069619 A1 3/2009 Rice
2009/0217777 A1 9/2009 Hanson et al.
2010/0025320 A1 2/2010 Johnson

* cited by examiner

FILTRATION METHOD FOR OPERATING A FILTRATION MODULE WITH GAS FEED AT ITS PERMEATE SIDE TO PREVENT BACKFLOW OF PERMEATE

CROSS-REFERENCE TO RELATED APPLICATIONS

This application is the National Stage of International Application No. PCT/NL2011/050511, filed Jul. 14, 2011, which claims the benefit of Netherlands Application No. NL 2005177, filed Jul. 30, 2010, the contents of which is incorporated by reference herein.

FIELD OF THE INVENTION

The invention relates to the field of filtration modules which are used for the filtration of fluids.

BACKGROUND OF THE INVENTION

Such modules are known in a wide variety of variants and mostly comprise a housing with one or more filter elements positioned therein which divide the space inside the housing in a feeding side and permeate side. One type of filtration modules is based upon so-called dead-end filtration in which fluid to be filtered is fed to the feeding side, from there is passed through the filter element(s), the solids being trapped in the filter and permeate (filtered fluid) is released at the permeate side. Another type is based upon so-called cross-flow filtration in which the majority of the fluid flows tangentially across the filtering surface rather than into the filter. The fluid is passed at positive pressure relative to the permeate side. A portion of the fluid which is smaller than the pore size of the filter passes there through as permeate, everything else is retained on the feeding side as retentate. The tangential motion of the bulk of the fluid across the filter causes trapped particles to be rubbed of the filtering surface. This means that a cross-flow filtration module can operate for a relative long period of time at relatively high solids loads in the fluid without the filter getting blinded.

EP-0 208 450 shows an embodiment of a cross-flow filtration module that is used for the filtration of beer. This module comprises a longitudinal cylindrical housing inside which a bundle of tubular ceramic membrane elements is provided. Unfiltered beer is fed via a fluid feed at the lower side of the module and there enters the inner feeding spaces of the tubular membrane elements. Clear permeate passes through the membrane walls, there enters a permeate space which is left clear around the outer sides of the membrane elements, and from there is drawn of via permeate outlets. Retentate is drawn off via a retentate outlet at the upper side of the module where it leaves the inner feeding spaces of the tubular membrane elements again. The retentate is then circulated via a cooler and a pump back again to the fluid feed at the lower side of the module.

It is a known phenomenon with cross-flow membrane filtration modules that there is a pressure drop in the fluid flow between the fluid feed and the retentate outlet. This pressure drop has the effect that the flux of permeate flowing through the membrane walls also differs over the length of the membrane elements. Close to the fluid feed the fluid pressure at the feeding side is higher and consequently the flux also, whereas closer to the retentate outlet the fluid pressure at the feeding side is lower and consequently the flux also. If the average pressure difference over the membrane walls between the feeding side and the permeate side, the so-called Trans Membrane Pressure (TMP), is relative low, it can even occur that over a part of the length of the membrane elements closest to the retentate outlet, a negative flux starts occurring because there the local pressure of the permeate at the permeate side has gotten higher than the local pressure of the fluid at the feeding side. The local TMP there has gotten negative. In other words, over this part of the length of the membrane elements, already filtered permeate starts flowing back from the permeate side towards the feeding side. This of course is very undesirable because it has a negative impact on the performances of the entire module. It decreases the net permeate yield or, if the module is controlled on the basis of a constant net yield in permeate, it increases the local flux near the fluid feed. This last phenomenon is caused by the fact that the negative local flux near the retentate outlet needs to be compensated for by that part of the membrane elements which still has a positive flux. All in all this can even have the effect that the minimum and maximum local fluxes come to lie so far apart that the maximum flux gets more than 100 times higher than the average flux. The higher local flux near the fluid feed has the effect that this part of the membrane elements gets contaminated far more quickly, which in turn substantially reduces the time that the module can be used for filtration before it needs to be cleaned.

US 2007/0158256 shows a filtration module having a membrane with on the left a feeding side with a fluid feed and a retentate outlet, and with on the right a permeate side with a permeate outlet. During filtration a fluid to be filtered is fed via the fluid feed into the feed side. This fluid partly permeates through the membrane towards the permeate side and there is removed as permeate via the permeate outlet. The part of the fluid which does not permeate through the membrane is removed as retentate via the retentate outlet. Both at the feed side and at the permeate side a cross-flow of fluid flowing along the membrane is achieved during filtration. On the feed side this is obtained by means of the provision of a retentate circulation line with a pump provided therein. On the permeate side this is obtained by means of the provision of a permeate circulation line with a pump provided therein. The forced flow in both circulation circuits is such that the pressure drop along the membrane is substantially equal over the whole surface of the membrane. During a filtration process the membrane is prone to get fouled. Therefore, from time to time, the membrane needs to get cleaned. This cleaning is done by closing a valve which is provided inside the permeate outlet at a high frequency. Each time the valve closes a pressure quickly builds up at the permeate side which is higher compared to the pressure at the feed side. This results in a temporary reversal of the fluid flow inside the membrane. Owing to the high frequency with which the valve is closed, a so-called high frequency back-pulsing of permeate thus takes place inside the membrane which high frequency back-pulsing each time briefly interrupts the filtration process. By combining this high back-pulse frequency with the cross-flow on both sides of the membrane during filtration, the membrane can be kept relative clean. The substantially constant pressure drop along the membrane during filtration helps to avoid a backflow of permeate during the filtration process.

A disadvantage, however, is that the extra pumps needed to obtain the required cross-flow/sweep flow along both sides of the membrane, make the installation expensive, consume lots of energy, and thus makes this filtration module rather expensive during use.

US 2009/0069619 schematically shows a membrane module having a fluid feed, a retentate outlet and a permeate outlet. A part of the fluid which is delivered via the fluid feed by-passes the membrane module unfiltered via a branch and is mixed with filtered permeate coming out of the permeate outlet. This mixture of filtered permeate and unfiltered fluid then arrives in an operation unit, such as an isomerisation reactor, after which it leaves the system as a treated product stream. The by-passing of unfiltered fluid aims to provide a high purity retentate fraction with less membrane surface area than would be required without the by-pass.

Besides the disadvantage that only non-critical permeate mixtures can be obtained, another disadvantage is that the membrane module needs to be thoroughly cleaned periodically. Further it is noted that in this known method also it can occur that over a part of a filter element inside the membrane module, a negative flux starts arising because there the local pressure of the permeate at the permeate side has gotten higher than the local pressure of the liquid at the feeding side. This is very disadvantageous because it has a direct negative impact on the aimed high-purity retentate fraction which is diluted again by the back flowing permeate.

US-2009/0217777 shows a method of concentrating an analyte that is present in a liquid. This method starts with the concentration of the liquid by passing it through a filtration module of which one or more ultra filter membranes are such that the analyte is unable to pass through it. Filtered liquid component not containing the analyte then forms permeate, while the liquid and analyte staying behind form retentate. After a certain period of time the filtration process is ended, after which the collecting of the thus formed retentate is started. As a first step in this collection the permeate side of the module is flushed with a gas. Subsequently the retentate side is flushed with a mixture of a gas and a liquid. The retentate solution flushed out can then be collected and includes the concentrated analyte.

It is noted however that in this known method also it can occur that over a part of the length of the ultra filter membranes, a negative flux starts because there the local pressure of the permeate at the permeate side has gotten higher than the local pressure of the liquid at the feeding side. This is very disadvantageous because it has a direct negative impact on the aimed concentration of the analyte which is diluted again by the back flowing liquid.

SUMMARY OF THE INVENTION

The present invention aims to overcome one or more of the above-mentioned disadvantages, or to provide a usable alternative. In particular the invention aims to provide a method for operation of a filtration module which can be used effectively for a longer period of time while at the same time the operational costs are lowered.

This aim is achieved by a filtration method for operating a filtration module according to the present invention. The method makes use of a module of the type which comprises a housing with at least one filter element positioned therein. The filter element defines a first space in the housing at a feeding side of its filtering surface and a second space at the opposite side of the filtering surface, the so-called permeate side. A fluid feed is provided which opens out in the first space at the feeding side of the filter element. A permeate outlet is provided which is in flow communication with the second space at the permeate side of the filter element. The filter element is placed in an upright position. The permeate outlet is positioned at a lower end of the filter element. According to the inventive thought a gas feed is provided which opens out in the second space at the permeate side of the filter element. The method comprises the feeding of pressurized gas into the second space during filtration. This pressurized gas then is able to fill up an upper part of the second space. This has the great advantage that at this upper part of the second space, permeate can no longer be present. Even if the local Trans Membrane Pressure (TMP) at this upper part gets negative, a negative flux of already filtered permeate flowing back from the permeate side to the feeding side can not occur at the location of this upper part, simply because permeate is not present there. Such undesired backflow of permeate can only occur if substantially the entire second space is filled up with permeate, which according to the invention no longer needs to be the case. Thus the invention makes it possible to substantially reduce or even fully prevent backflow of permeate. This makes it much easier to obtain a certain yield of permeate per length of membrane elements. The maximum value of the local flux closest to the fluid feed can be much lower compared to the state of the art. No or at least less positive flux compensation needs to take place. Because of this lower value of the local maximum flux, the filter element is likely to get contaminated at a much slower rate, particularly for that part closest to the fluid feed. This makes it possible to use the module for a longer period of time before it is necessary to clean it. In addition or in the alternative it has now also become possible to increase the length/height of the filter element, without having to suffer negative consequences of possible backflow.

The filtration module can be used for all kinds of filtration, for example dead-end filtration. Preferably however the invention is used in a cross-flow filtration module which is provided with a retentate outlet which, like the fluid feed, is also in flow communication with the first space at the feeding side of the filter element. The retentate outlet is provided at another level than the fluid feed along the filter element. Because of a pressure drop of the fluid between the fluid feed and the retentate outlet, during filtration, the fluid is forced to flow across the filtering surface from the fluid feed towards the retentate outlet.

Advantageously the fluid feed is positioned at or near a lower part of the filter element and, in the case of cross-flow filtration, the retentate outlet is then preferably positioned at or near an upper part of the filter element. This gives a pressure drop of the fluid in the first space at the feeding side of the filter element from the bottom to the top of the module. This direction of the pressure drop has the positive effect that the maximum local TMP occurs at the lower part of the filter element, which in turn has the effect that the maximum flux takes place at this lower part. Since the pressurized gas is present in the upper part of the second space it is then possible to have the level of permeate in the lower part of the second space connect as much as possible to the height of the filter element where a positive flux of permeate still occurs.

In a further advantageous embodiment the gas feed is positioned at a level above the permeate outlet. In that way the gas which is fed into the second space during filtration, immediately enters that part of the second space which it needs to fill up during this filtration in order to prevent the negative backflow of permeate. Nevertheless, if in an embodiment it is desired for a certain amount of the gas to get mixed with the permeate, then it is also possible to provide the gas feed at a lower level, that is to say at a level where permeate is actually flowing. This may even be at a level below the permeate outlet.

The filter element can have all kinds of forms and shapes, for example flat or tubular, and can have all kinds of pore sizes. In a preferred embodiment it is a membrane filter element. The membrane filter element can be used for micro-filtration, with pores in a range of 0.1-10 microns, but also for ultra-filtration, nano-filtration or reverse osmosis when the pores are chosen smaller. Because of the small pore sizes with a membrane filter element, pressurized gas shall not easily start penetrating from the permeate side towards the feeding side.

Preferably the membrane filter element is made hydrophilic. This has the effect that gas is blocked from flowing through the filter element because of capillary pressure inside the filter element passages, in particular the membrane pores. The capillary properties of the membrane structure cause that the membrane is wetted and that high pressures are required before the gas can start permeating through the membrane. The membrane filter element however can also be made hydrophobic if desired.

In a further embodiment a control unit is provided which is designed for adapting the gas pressure of the pressurized gas in the upper part of the second space in dependence of certain measured control parameters. These control parameters can for example be the yield in permeate drawn off via the permeate outlet, and/or pressures at one or more locations inside the module, and/or permeate level inside the second space. In the first example the gas pressure is adapted each time by the control unit to a value which makes it possible to keep withdrawing a certain desired yield of permeate via the permeate outlet during filtration. In practice this means that the longer the module is operating and the more contaminated its filter element gets, the lower the gas pressure needs to be made so that the level of effectively permeating filtering surface where a positive flux takes place can keep up rising together with the level of permeate. In another example the gas pressure can be adapted each time by the control unit to a value which is substantially equal to or lower than the average fluid pressure in the first space at the feeding side of the filter element during filtration. This prevents too much gas from flowing towards the feeding side. In addition thereto or in the alternative it is also possible to have the control unit adapt the gas pressure at the beginning of a filtration cycle to a value which corresponds to a certain maximum starting level of permeate at the permeate side. In particular this starting level is at least lower than half the height of the filter element during filtration. More in particular this starting level lies between 5-25% of the height.

The gas can for example be air or carbon dioxide or nitrogen or any other suitable gas. If for example the fluid to be filtered is beer, then using carbon dioxide has the advantage that it is no problem if some of the gas gets mixed with the permeate and leaves the second space together with the permeate.

The invention also relates to a filtration module for performing the above described method during a filtration cycle either with cross-flow filtration or dead end filtration.

The inventive thought can also be used during a cleaning cycle of the above described filtration module, in particular during a backwash of the filter element. During such a cleaning cycle pressurized cleaning fluid is fed to the second space at the permeate side of the filter element, for example via a separate cleaning fluid inlet or by connecting the permeate outlet to a cleaning fluid reservoir. The cleaning fluid then flows in the backwards direction through the filter element and flushes out any contamination which has gotten trapped therein. The thus backwashed cleaning fluid together with the washed out contamination particles can then be discharged from the first space at the feeding side of the filter element, for example via the fluid feed and/or, in the case of cross-flow filtration, via the retentate outlet or by a separate cleaning fluid outlet. By simultaneously feeding pressurized gas to the second space during this cleaning process, it is possible to force the cleaning fluid to first flow through that part of the filter element which has gotten the most contaminated, that is to say the lower part of the filter element where the maximum positive flux has taken place during the preceding filtration cycle. Thus the cleaning fluid can be directed purposively. Should the pressurized gas not be there to force the cleaning fluid to flow through the most contaminated lower parts of the filter element, then the cleaning fluid would seek the way of the least resistance, that is to say first flow through the least contaminated upper parts of the filter element. After the most contaminated lower parts of the filter element have thus been flushed thoroughly clean, according to the invention it is possible to reduce the gas pressure to such an extent that the level of cleaning fluid at the permeate side rises and thus starts to flow through higher parts of the filter element and start to thoroughly clean those higher parts of the filter element also. All in all this can greatly improve the efficiency of the backwashing cleaning cycle. It is noted that the cleaning fluid may be any suitable fluid, for example water, but that it may also be formed by earlier obtained permeate itself.

Further advantageous embodiments are stated throughout herein.

BRIEF DESCRIPTION OF THE DRAWINGS

The invention shall be dealt with in more detail below with reference to the accompanying drawings, wherein.

DETAILED DESCRIPTION OF THE INVENTION

Figure 1:
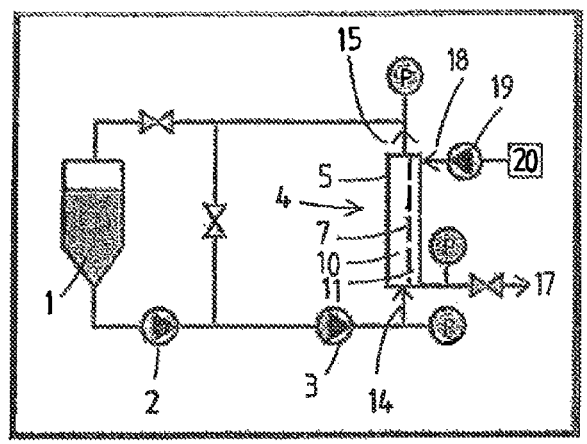
FIG. 1 shows a flow diagram of an installation for the filtering of a fluid including an embodiment of a cross-flow filtration module according to the invention.

In FIG. 1 an installation for the filtering of a fluid comprises a storage vessel 1, a feed pump 2, a recirculation pump 3 and a cross-flow filtration module 4. The module 4 comprises a housing 5 inside which a membrane filter element 7 is placed. The element 7 is placed in a fully upright position in which it extends vertical from the bottom to the top of the housing 5. The element 7 divides the interior space of the housing 5 in a first space 10 at the feeding side and a second space 11 at the permeate side. The first space 10 at its lower side connects to a fluid feed 14 and at its upper side connects to a retentate outlet 15. The second space 11 at its lower side connects to a permeate outlet 17 and at its upper side connects to a gas feed 18. The gas feed 18 via a pump 19 can be fed with pressurized gas from a gas buffer 20.

During operation of the filtration module 4, fluid to be filtered, for example unfiltered beer, is pumped via the fluid feed 14 into the first space 10. There it flows upwardly along the filter element 7 towards the retentate outlet 15. Part of the fluid flows through the filter element 7 and there enters the second space 11. This filtered permeate accumulates in the lower part of the second space 11 and from there is discharged via the permeate outlet 17. At the same time pressurized gas is fed to the second space 11 via the gas feed 18. This gas fills up the upper part of the second space 11. This can also be clearly seen in FIG. 2.

Figure 2:
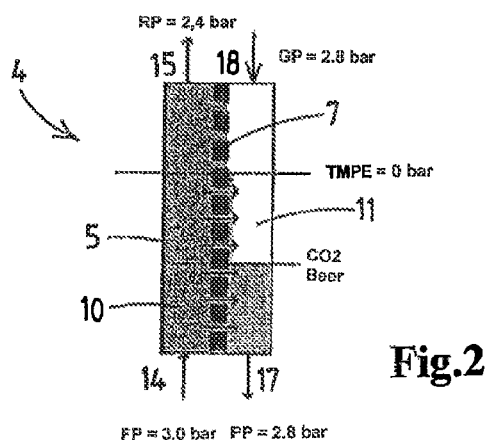
FIG. 2 shows the filtration module of FIG. 1 in more detail during filtration with gas being fed to the permeate side.
Figure 3:
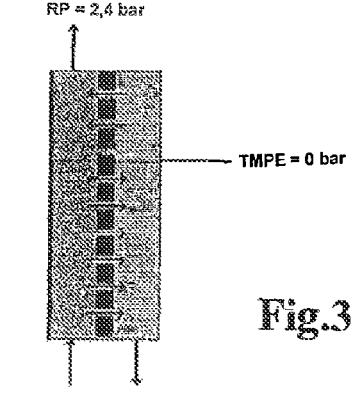
FIG. 3 shows the filtration module of FIG. 1 in more detail during filtration without gas being fed to the permeate side.

The positive effect of the invention shall now be explained by pointing out the differences between the situations that the filtration module 4 is fed with gas (FIG. 2) and is not fed with gas (FIG. 3).

If the second space 11 is not fed with gas, as shown in FIG. 3, then it completely fills itself with permeate. If for example the feeding pressure of the fluid to be filtered at the fluid feed 14 is 3.0 bar and the outlet pressure of the retained retentate at the retentate outlet 15 is 2.4 bar, and the outlet pressure of the filtered permeate at the permeate outlet is 2.8 bar, then the local Trans Membrane Pressure (TMP) can be calculated.

The TMP is the driving force for the permeation/filtration. In the given example the local TMP has a maximum value of 0.2 bar at the bottom side of the filter element 7, gradually decreases upwardly along the filter element 7, and at some point is equal to zero, and from there gets to be negative. All along the lower part of the filter element 7 where the local TMP is positive, there is a positive flux of permeate flowing from the first space 10 towards the second space 11. All along the upper part of the filter element 7 where the local TMP is negative, there is a negative backflow of already filtered permeate flowing back from the second space 11 towards the first space 10.

Figure 4:
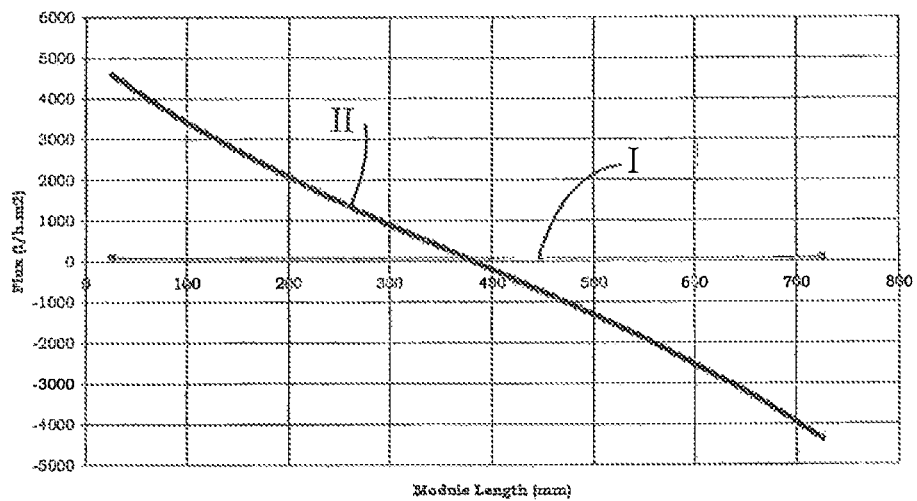
FIG. 4 shows the local flux as a function of the length along the filter element of the gasless situation of FIG. 3 at the start of filtration cycle.

FIG. 4 shows this situation at start up of a new filtration process for a beer filtration module having a filter element with a total height of 750 mm. The thin horizontal line I shows the average flux of permeate which leaves the module via the permeate outlet 17. This average flux here is 80 l/m2·h. The thick downwardly sloping line II is the local flux varying over the height of the filter element 7, which is necessary to obtain the desired average flux. As can be seen the local flux needs to vary from more than 4500 to −4200 l/m2·h in order to be able to obtain the desired average flux of merely 80 l/m2·h. In the upper part of the module there is a huge amount of already filtered permeate flowing back to the feeding side. This huge amount of backflow needs to be compensated for by a huge positive flow of permeate at the lower part of the module.

Figure 5:
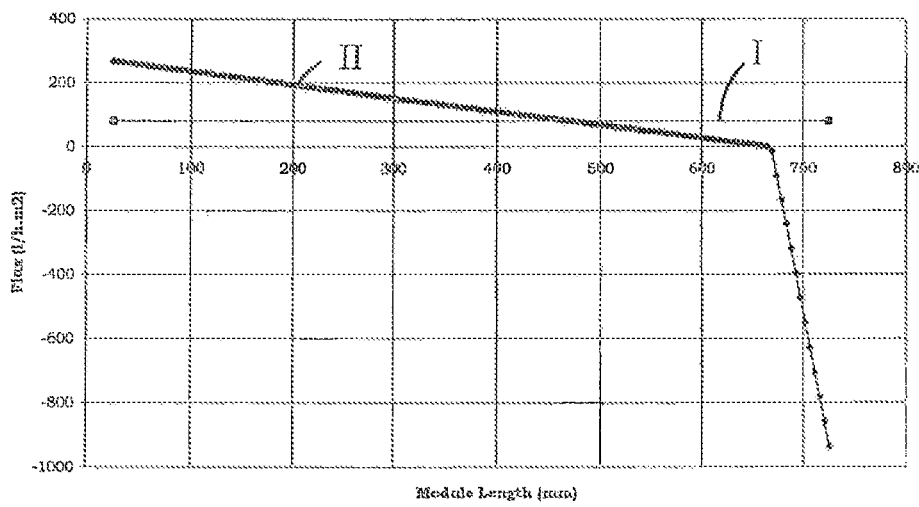
FIG. 5 shows the local flux as a function of the length along the filter element of the gasless situation of FIG. 3 after duration of 10 minutes of filtration.

The huge positive flow in the lower part of the module however has the effect that this lower part is getting contaminated rapidly. FIG. 5 shows the situation after only 10 minutes, assuming that the average flux is still desired to be the same 80 l/m2·h. As can be seen the differences between the positive flux along the lower part of the filter element and the negative flux along the upper part of the filter element are still huge, whereas the absolute values have gotten lower. This means that a large part of the filter element 7 has gotten contaminated and it becomes necessary to clean the filter element.

If the second space 11 is fed with gas, as shown in FIG. 2, then it can partly fill itself with permeate and partly with the gas. With this the pressure of the gas is controlled such that it is substantially equal to the pressure of the permeate. If the feeding pressure of the fluid to be filtered at the fluid feed 14 is still 3.0 bar and the outlet pressure of the retained retentate at the retentate outlet 15 is still 2.4 bar, and the outlet pressure of the filtered permeate at the permeate outlet is kept at 2.8 bar, then the local Trans Membrane Pressure (TMP) stays the same as in the gasless situation of FIG. 3. The point where the TMP is equal to zero then lies at the same height during start up of a filtration process, and all along the lower part of the filter element 7 where the local TMP is positive, there still is a positive flux of permeate flowing from the first space 10 towards the second space 11. However, all along the upper part of the filter element 7 where the local TMP is negative, there can not occur a negative backflow of already filtered permeate flowing back from the second space 11 towards the first space 10, since permeate is not present there but gas.

Figure 6:
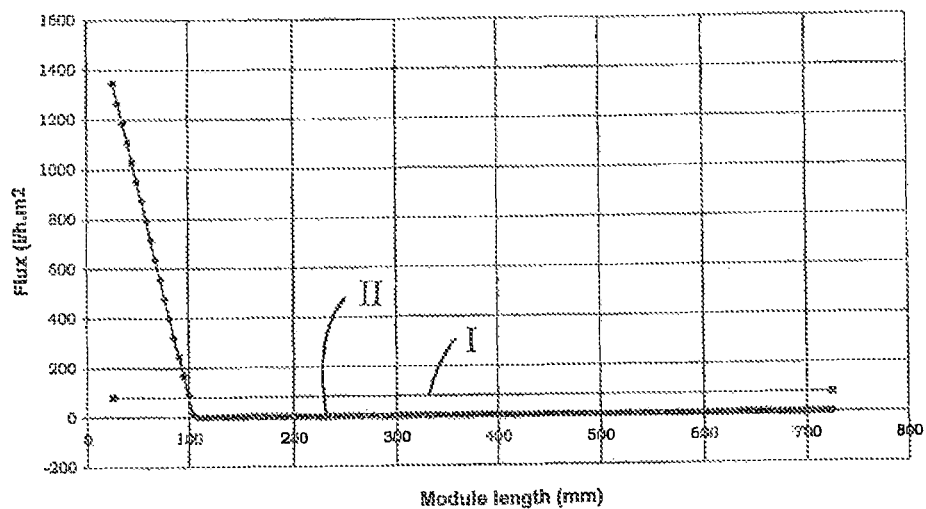
FIG. 6 shows the local flux as a function of the length along the filter element of the gas filled situation of FIG. 2 at the start of filtration cycle.

FIG. 6 shows this gas filled situation according to the invention at start up of a new filtration process again for a beer filtration module having a filter element with a total height of 750 mm. The thin horizontal line I shows the same average flux of permeate which leaves the module via the permeate outlet 17. The thick partly downwardly sloping line II is the local flux varying over the height of the filter element 7, which is necessary to obtain the desired average flux. As can be seen the local flux now only needs to vary from close to 1400 to 0 l/m2·h in order to be able to obtain the desired average flux of merely 80 l/m2·h. In the upper part of the module there is none already filtered permeate flowing back to the feeding side. Since no compensation needs to take place, the lower part of the module only needs to have a positive flow which is large enough to be able to obtain the desired average flux.

Figure 7:
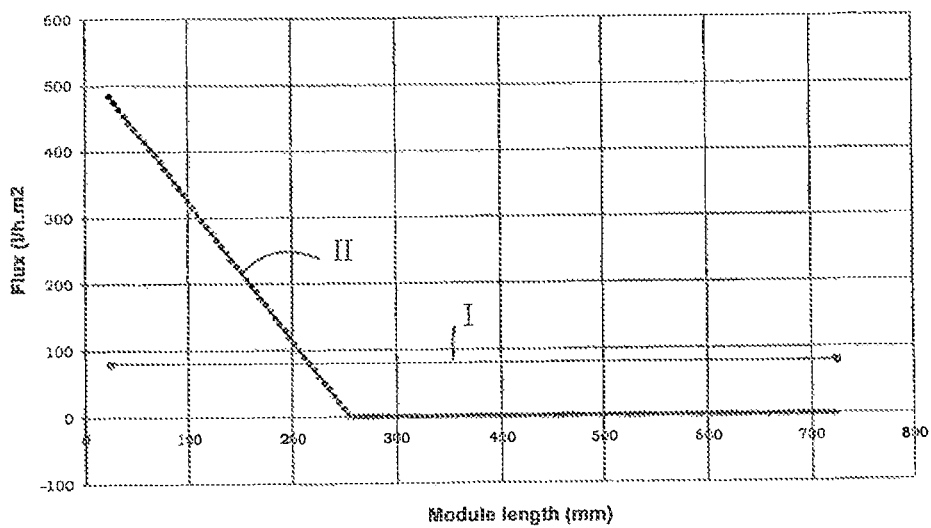
FIG. 7 shows the local flux as a function of the length along the filter element of the gas filled situation of FIG. 2 after duration of 10 minutes of filtration.

The lower positive flow in the lower part of the module has the effect that this lower part is getting contaminated far more slowly compared to the gasless situation of FIG. 3. FIG. 7 shows the situation after 10 minutes, assuming that the average flux is still desired to be the same 80 l/m2·h. As can be seen the positive flux still only needs to occur along a relative small lower part of the filter element and a negative flux still can not occur along the upper part of the filter element. This means that the filter element 7 has gotten hardly contaminated and it is not necessary at all to clean the filter element.

Figure 8:
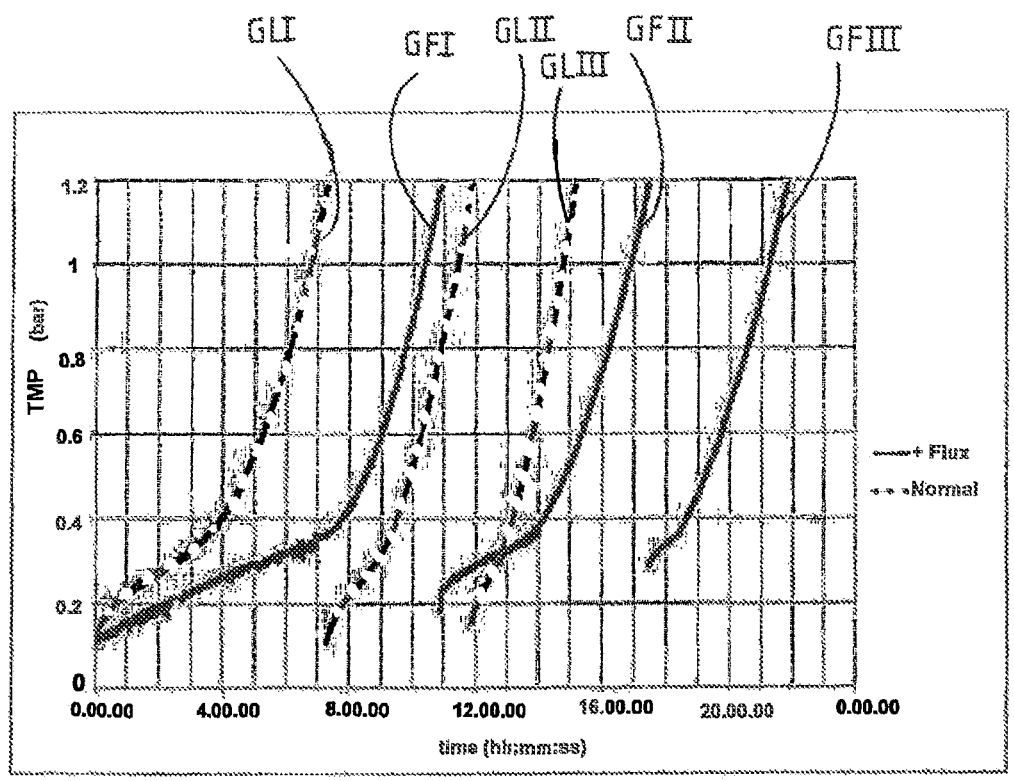
FIG. 8 shows the average TMP as a function of the time for three filtration cycles both for the gas filled situation of FIG. 2 and for the gasless situation of FIG. 3.

The above is acknowledged by FIG. 8 which shows the average TMP as a function of the filtration time on the one hand for the state of the art gasless situation (Normal) and on the other hand for the inventive gas filled situation (+Flux). For each of the situations three filtration cycles are shown, in which a filtration cycle ends as soon as the average TMP reaches the value 1.2 bar. Then a cleaning cycle starts in the form of a backwashing cycle, after which a new filtration cycle is started. The cycles for the gasless situation are indicated with GL, the cycles for the gas filled situation are indicated with GF. As can be seen it takes more than 40% more time in the gas filled situation for the filter elements to get contaminated so bad that the TMP reaches 1.2 bar. This may lead to a cost reduction in operational costs of more than 50%.

Besides the embodiment shown all kinds of variant embodiments are possible. For example the module and filter element placed therein may have different shapes and dimensions. Also the module may be oriented such that its filter element is placed in a partially upright position, that is to say under an angle with respect to the horizontal, in particular an angle of at least 45 degrees. The more vertical the filter element is placed however, the more easily the permeate level can be managed. Instead of only one filter element inside the housing, it is also possible to use a number of filter elements, for example a bundle of membrane tubes. Instead of using the idea of filling part of the permeate space of a filtration module with gas for the filtration of beer, it can also be used for the filtration of all kinds of other fluids, for example water. If the amount of particles in the fluid which need to be retained by the filter element is low, then it is also possible to use the invention for a module without a retentate outlet (dead-end filtration). As indicated in the introduction to the description it can also be used during a backwashing cycle to help force the backwashing fluid to first flow through the most contaminated part of the filter element. This may not only improve the cleaning process but also may save a lot of backwashing fluid and chemicals used therefore. Furthermore a complete cleaning action in which the filter element is taken out of the module housing and/or a complete replacement of the filter element can be postponed substantially now.

Thus the invention provides a cost effective, efficient and user friendly filtration module and method for operating it, during filtration and if desired also during cleaning.

LIST OF REFERENCE SIGNS

1. Storage vessel
2. feed pump
3. recirculation pump
4. cross-flow filtration module
5. housing
7. membrane filter element
10. first space at feeding side
11. second space at permeate side
14. fluid feed
15. retentate outlet
17. permeate outlet
18. gas feed
19. pump
20. gas buffer
FP feed pressure
RP retentate pressure
GP gas pressure
PP permeate pressure
TMP transmembrane pressure
TMPE local transmembrane pressure
GF gas filled situation
GL gasless situation

The invention claimed is:
1. A filtration method for operating a filtration module, the module comprising:
a housing with at least one filter element positioned therein, the filter element defining a first space in the housing at a feeding side of its filtering surface and a second space at an opposite permeate side thereof;
a liquid feed opening out in the first space at the feeding side of the filter element; and
a liquid permeate outlet in flow communication with the second space at the permeate side of the filter element;
in which the filter element is placed in an upright position, the liquid permeate outlet being positioned at a lower end of the filter element, and
a gas feed being provided opening out in the second space at said permeate side of the filter element,
the method comprising the steps of:
feeding a first stream of pressurized liquid to be filtered to the first space at the feeding side of the filter element;
discharging filtered liquid permeate from the second space at the permeate side of the filter element; and
feeding pressurized gas to the second space at the permeate side of the filter element;
wherein a cross-flow filtration module is used having a retentate outlet in flow communication with the first space at the feeding side of the filter element, which retentate outlet is positioned at another level than the liquid feed along the filter element;
wherein non-filtered retentate is discharged via the retentate outlet from the first space at the feeding side of the filter element such that a pressure drop of the liquid between the liquid feed and the retentate outlet is created to have the liquid forced to flow across the filtering element from the liquid feed towards the retentate outlet; and
wherein the step of feeding pressurized gas to the second space is performed during filtration simultaneously with the steps of feeding the first stream of the pressurized liquid to be filtered to the first space and discharging the filtered liquid permeate from the second space, in which the second space fills itself with the liquid permeate in a first portion of the second space and with the pressurized gas in a second portion of the second space, wherein a separation level between the liquid in the first portion and the gas in the second portion of the second space can be adapted by adapting a gas pressure of the pressurized gas.

2. The filtration method according to claim 1, wherein the second portion of the second space that fills itself with the gas comes to lie on top of the first portion of the second space that fills itself with the liquid permeate.

3. The filtration method according to claim 2, wherein the pressurized gas is fed to the second space for having the liquid permeate fill up a part of the second space that connects to a height of the filter element where a positive forward flow of the liquid permeate from the first space to the second space occurs during filtration.

4. The filtration method according to claim 1,
wherein a cross-flow filtration module is used having the retentate outlet provided at an upper end of the filter element and the liquid feed positioned at a lower end of the filter element, and
wherein a pressure drop of the liquid between the liquid feed and the retentate outlet is created which runs from the lower to the upper end of the filter element.

5. The filtration method according to claim 1,
wherein a cross-flow filtration module is used having the gas feed positioned at a level above the liquid permeate outlet, and
wherein the pressurized gas is fed directly into the upper part of the second space.

6. The filtration method according to claim 1, wherein a hydrophilic filter element is used for preventing the gas from flowing through the filter element.

7. The filtration method according to claim 1, wherein the gas pressure of the gas which is fed via the gas feed into the second space at the permeate side of the filter element is adapted by means of a control unit to a value which is substantially equal to or lower than the average liquid pressure in the first space at the feeding side of the filter element during filtration.

8. The filtration method according to claim 1, wherein the gas pressure of the gas which is fed via the gas feed into the second space is adapted by means of a control unit in dependence of achieving a desired yield of the liquid permeate which is drawn of via the permeate outlet during filtration.

9. The filtration method according to claim 1, wherein the gas pressure of the gas which is fed via the gas feed into the second space is adapted by means of a control unit at a beginning of a filtration cycle in order to obtain a desired starting level of the liquid permeate at the permeate side, in particular a level which is lower than half the height of the filter element during filtration, more in particular between 5-25% of the height.

10. The filtration method according to claim 1, wherein the gas pressure of the gas fed into the second space is gradually lowered over time during filtration.

* * * * *